Dec. 5, 1967 C. GREENFIELD Re. 26,317
PROCESS AND APPARATUS FOR DEHYDRATING WASTE SOLIDS CONCENTRATES
Original Filed Sept. 26, 1963
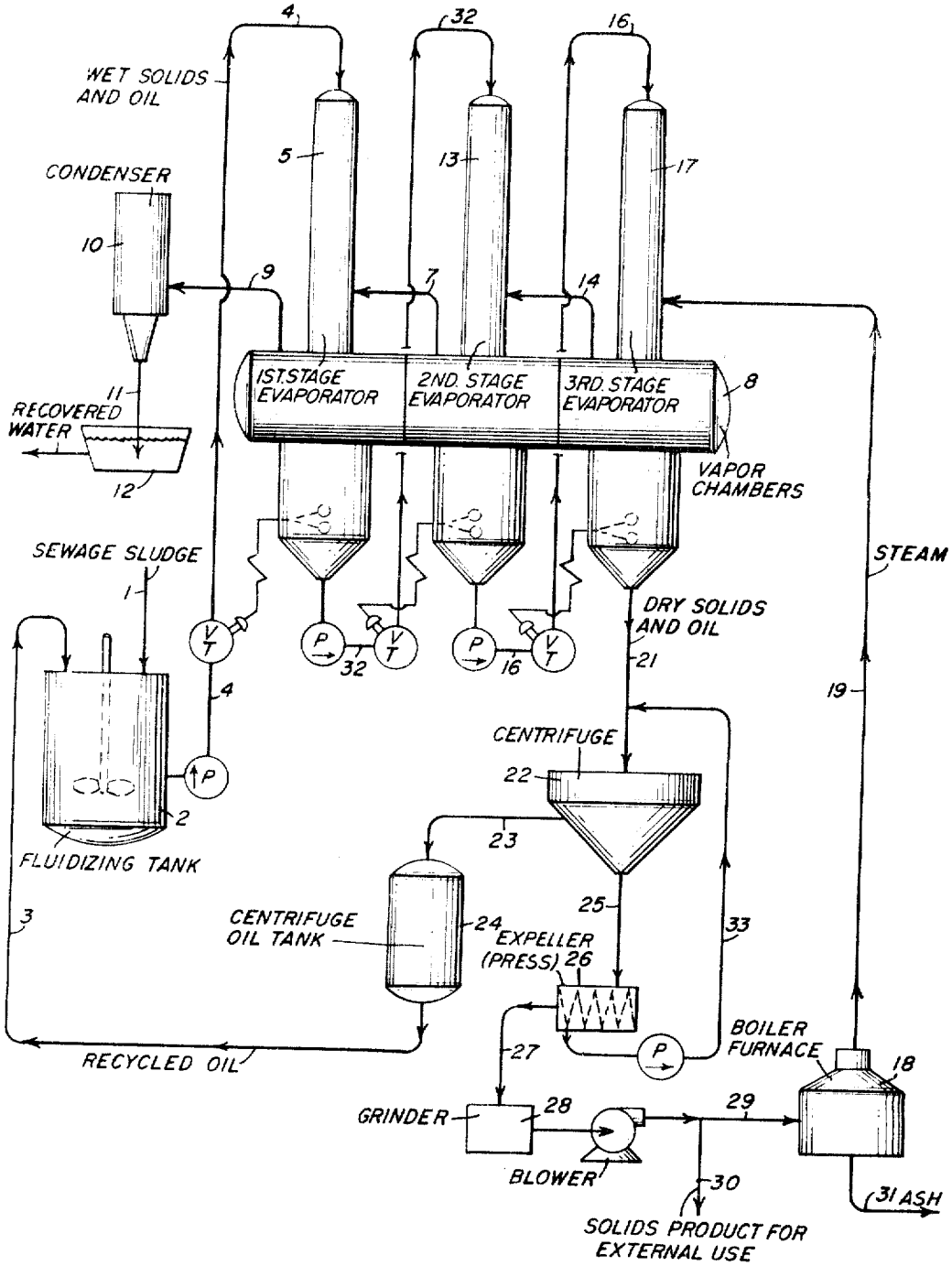
INVENTOR
CHARLES GREENFIELD United States Patent Office Re. 26,317
Reissued Dec. 5, 1967

26,317

PROCESS AND APPARATUS FOR DEHYDRATING WASTE SOLIDS CONCENTRATES

Charles Greenfield, 35 Walnut St., Murray Hill, N.J. 07971

Original No. 3,251,398, dated May 17, 1966, Ser. No. 311,792, Sept. 26, 1963. Application for reissue Oct. 27, 1966, Ser. No. 597,497

10 Claims. (Cl. 159—17)

Matter enclosed in heavy brackets [ ] appears in the original patent but forms no part of this reissue specification; matter printed in italics indicates the additions made by reissue.

This invention relates to an improved *apparatus and* process for dehydrating waste solids concentrates, especially sewage sludge. More particularly, it relates to [a] *an apparatus and* process wherein oil-admixed sewage sludge is subjected to sequentially higher dehydration steps at successively higher temperatures and successively higher concentrations.

The economic disposal of sewage sludge is a recognized problem. Ideally, sewage sludge disposal *apparatuses and* processes should provide ease of disposition, avoidance of pollution, economic operation and hygienic handling. Furthermore, it is desirable to be able to obtain products which are either valuable in themselves or can be utilized to further the economics of the process.

In the customary processing known to the prior art, raw sewage is first treated by settling, aeration, and chemicals to generate a stream of water sufficiently clean to be discharged to a region of ultimate disposal such as a natural stream or a river, and a stream of quite watery sewage sludge which is discharged to a closed tank called a digester. The digester is of sufficient volume that sewage sludge which it receives may have a dwell time in it of up to thirty days or longer. Heating means such as hot water coils are provided in the digester, and the sludge is maintained at an elevated temperature to provide anaerobic bacterial digestion of organic constituents which break down the solids in part into gaseous material. The gaseous material may have a substantial content of methane and thus be drawn off continuously to be burned as a fuel for heating the water circulated through the digester coils. Sewage solids in a stream which may have a water content of about ninety-five percent are drawn off from the digester and spread out in large drying beds for final evaporative drying. The resulting dry solids may be incinerated or disposed of to farms for fertilizer and other possible uses.

The *apparatus and* process of this invention [comprises] *comprise a systematic arrangement of equipment and* a series of steps for treating sewage sludge as this sludge is in condition to be received in a digester according to the process of the prior art. Thus the process *and apparatus* of the present invention [does] *do* not replace the aforementioned settling, aeration, and chemical treatment steps applied to raw sewage, *nor the apparatus for carrying them out,* but [does] *do* replace all traditional *subsequent apparatus for and* steps of sludge and solids treatment in a digester and drying beds, and in replacing *this apparatus and* these steps [accomplishes] *accomplish* all of their purposes.

This invention provides an improved *apparatus and* process for accomplishing these purposes in at least that the equipment needed to carry it out is far more compact and appreciably less expensive than the digestion equipment and drying bed area and installations, particularly where drying beds are enclosed by greenhouse-like structures for odor control and year-round utilization.

The sewage sludge dehydration process of this invention comprises admixing the sewage sludge with an oil to obtain a mixture which will remain fluid and pumpable after the removal of the water content therefrom; subjecting the resultant oil-containing mixture to a plurality of sequential deyhdration steps by heat evaporation wherein each of the successive dehydration steps is at a successively higher temperature and the resulting oil-containing mixtures are of successively higher concentration because of increasing dehydration, the evolved vapors from each heat evaporation step supplying a substantial portion of the heat requirements of the preceding heat evaporation step, and withdrawing a resultant substantially anhydrous sewage sludge *and* oil slurry. Additionally, the oil can be separated from the sewage slurry to provide a substantially oil-free sewage solids product. The latter can be utilized for fertilizer, possibly animal food products, or as fuel for the process.

The sewage sludge contemplated as being treated is the raw material concentrate generally known in the art, i.e., one containing non-fat solids in an amount of about 3 to 30 weight percent, usually 3 to 15 weight percent; fat content in an amount of about 0.3 to 15 weight percent or higher; with the remainder predominantly water. The solids particle size should be a maximum of about ¼ inch which encompasses the normal distribution of sewage sludge. Larger particles such as from garbage can be comminuted by existing techniques, making the process applicable to garbage under the term "sewage."

The oils that are utilized for admixture with the sewage sludge are inert, relatively non-volatile oils or fats, or other non-volatile oil-like materials or non-volatile fractions thereof. Typical of these are tallow oil which can be derived directly in the operation, petroleum oils, fuel oils, glycerine, glycols and mixtures thereof, including industrial by-products, etc. It is desirable to employ an oil that imparts process credits, i.e., one that can add value to the sewage product, such as waste oils normally found in sewage or industrial waste, or fuel oils, or utilize oils derived in the process so as to minimize cost factors. The quantity of oil is such that its ratio in the system is in the range of about 2 to 20 parts by weight, based on the non-fat solids. This refers to total oil, i.e., that added plus that derived from the process for reuse. This amount of oil gives a fluid pumpable mixture even with the mixture's water content removed. The term "fluid" is intended to be synonymous with "liquid," i.e., taking the shape of the container. This will thus also include heavy, viscous fluids which are pumpable but still suitable for heat transfer purposes.

The plurality of sequential dehydration heat evaporation steps connotes at least two. The equipment that can be employed are multiple-effect evaporators known in the art, e.g., Mojonnier, Bufflovak, Rodney-Hunt, etc. Functionally, the evaporator equipment may be of the forced circulation, flash, falling film recirculation, single pass, rotary wiped film, or indeed any suitable type. The temperatures, pressures and concentrations in each of the successive series of dehydration steps are largely empiric in nature, depending upon the systems and oils being treated. Normal processing temperatures of the oil and sewage sludge mixture may be in the range of about 70° F. to 250° F. in the first stage and 150° F. to 400° F. in the 2nd, 3rd or final stages of a multi-effect drying system, depending on the desired quality of the end product and economics of fuel utilization, cooling water availability, capital investment, etc. These ranges and progressions of temperature are reasonable in the case where the flows through the evaporator of the mixture being dehydrated and the heating or drying steam are substantially countercurrent, the evaporator in this mode of operation being called a backward flow evaporator. The preferred processing temperatures of the mixture or slurry are in the range of 90° to 175° F. in the first stage, and 200° to 350° F. in the 2nd, 3rd, or last stages for the countercurrent or backward flow case mentioned above.

In the foregoing paragraph the expression "first stage" refers to that part of the evaporator equipment in which the oil and sewage sludge mixture is subjected to the first step of a sequential plurality of dehydration steps, two or three or more corresponding to "2nd stage," "3rd stage," etc. The expression "effect" on the other hand, as in "multiple-effect" or "multi-effect," is related to the flow and action of the heating medium, customarily steam, in the evaporator equipment. Where the flow of the oil and sewage sludge mixture or slurry being heated and dried is countercurrent to that of the heating steam (backward flow case), the first stage of the evaporator is the same as its last effect.

The pressures are not critical and are controlled with temperatures to achieve desired evaporation rates in a given design. Thus the first stage pressure on the oil and sewage sludge mixture will conveniently be ½" Hg abs. to approximately atmospheric. The pressures then increase in successive stages responsive to the temperatures in the aforedescribed countercurrent or backward flow case. It is advantageous to operate the first stage at subatmospheric pressures, and the final stages at close to atmospheric.

The effect of the sequential dehydration steps can be seen from the following. For example, in a double-effect evaporator with feed entering at 80° F., the material can leave the evaporator at 225–250° F. with ratios of approximately one pound of steam utilized for 1½ to 1¾ pounds of water evaporated approximately; whereas in normal single-effect operations, about 1½ pounds of steam could be required to achieve the same result with only one pound of water evaporated. If triple or more effect evaporation is utilized, even further economies in fuel consumption are made possible.

It should be noted that the evolved vapors from each of the heat evaporation steps supply a substantial portion of the heat requirement of the preceding heat evaporation step in the case of a backward flow evaporator. The only heat input is to raise the temperature of the components to evaporation temperatures plus heat losses.

The product from the operation thus is generally a substantially anhydrous sewage sludge and oil slurry, i.e., one containing no more than about 5–10 weight percent water on a non-fat basis. The water content is such as to permit fuel efficiency when the solid is burned or disposed of as a marketable product.

Where desired, the oil can be separated from the slurry by centrifuging, pressing, etc. to provide a substantially oil-free sewage solids product. Municipal sewage on a dry or water-free basis generally contains from 3 to 15% oil and grease, so that if the dry solids product is maintained within these limits of oil and grease content, the operation is self-sustaining in regards to oil required for mixing with the sewage sludge. Thus oil need be added initially only at start-up. Higher oil content in the sewage sludge feed to the process of this invention can result in oil being made available for use as a net product of the process. As discussed below, substantial process credits are obtained by employing the sewage solids product as fuel for the process. In many cases this can be the only fuel required, giving readily apparent economy of operation.

This invention will be better understood by reference to the following examples and preferred embodiments as discussed in further detail in connection with the flow diagram shown in the drawing.

Referring now to the flow diagram, sewage sludge enters fluidizing tank 2 through line 1. According to samples taken at Hershey, Pennsylvania, this sludge may typically comprise 7.2 weight percent solids and fats, and 92.8 weight percent water. Of the 7.2 solids, 1% is fat and the other is non-fat solids. About 50 parts of tallow are added through line 3 to tank 2 to maintain a pumpable fluid system or mixture even after evaporation of the water content therefrom. The system is agitated in fluidizing tank 2, then pumped through line 4 to first stage or third effect evaporator 5. In evaporator 5 water is boiled off at a pressure of two inches Hg absolute. The temperature of the partially dehydrated product of the entering fluid slurry or mixture of sewage sludge and tallow or oil is 110° F. The system is heated by vapor from line 7 which is at a temperature of 145° F. Vapor is removed from vapor chamber 8 and through line 9 at 100° F. into condenser 10 where cooling water mixes with the vapor and condenses same. The water is discharged through line 11 to hot well 12, and can be reused through the sewage treatment plant. One-third of the total water is thus removed in the first stage of the evaporation.

The partially dehydrated sewage sludge and oil slurry product from evaporator 5 is continuously removed through line 32 by level control to second stage evaporator 13. In the second stage evaporator, a similar procedure is followed as in the first stage, except that the product temperature is 150° F. The heating medium is 190° F. steam coming from the following stage through line 14. An additional one-third of the water is removed in the second stage.

The further dehydrated sewage sludge and oil slurry withdrawn from the second stage evaporator 13 is pumped through line 16 to the third stage evaporator 17. Product temperature is 250° F., supplied by steam at 300° F., generated by boiler furnace 18 and transmitted through line 19. The dehydrated slurry withdrawn through line 21 contains 1% water and approximately 15% solids, the remainder being oil. This fluid mixture is delivered to centrifuge 22.

Level control in each stage of the evaporator equipment is maintained by a level sensing element in the slurry sump of each stage which transmits signals to a throttle valve following the pump in the slurry pumping line wherethrough the stage in question is supplied. As shown, level sensing elements in the slurry sumps of first, second, and third evaporator stages 5, 13, and 17 control pump discharge throttle valves in slurry feed lines 4, 32, and 16 respectively. The evaporator level control system illustrated and described is considered to be of a conventional nature and itself does not constitute part of the present invention.

The centrifuge separates the dehydrated sewage sludge and oil slurry into two streams. Through line 23 a relatively clear oil stream is withdrawn and delivered to centrifuge oil tank 24. This oil is recycled through line 3 as previously described. Excess can be withdrawn as stated above.

A second stream is withdrawn through line 25 which is a phase containing substantially all of the sewage solids but which is still about 30 weight percent oil. This stream is delivered to expeller 26. Dried expeller sewage solids are delivered through line 27 to grinder 28 and then blown to boiler furnace 18 through line 29. Alternatively, boiler furnace 18 can be by-passed and the material withdrawn through line 30 for use as for fertilizer. When the withdrawn expelled solids are utilized for fuel credits as shown in boiler 18, they can produce substantially all the live steam required for operation of the process, thus providing a self-sustaining operation in respect of fuel requirements.

The importance of fuel economy is particularly striking in the case of drying of sewage sludge where the final solids product can be burned and utilized as a fuel to carry out the subsequent evaporation of the dilute sewage sludge material. This "boot strap" type of operation can be entirely sustained in normal municipal or plant sewage systems by using multi-effect drying methods. By taking the dried product and burning it as fuel in a furnace, generated steam sustains the entire drying of the dilute sludge without any added fuel necessary. This is a most important feature in sewage sludge drying since it represents great economy in that no purchased fuel is required, or if at all, only a minimum quantity is needed (depending on capital investment requirements). Also, in the closed system of evaporation the pollution of the atmosphere is reduced to almost zero. The only by-product then is the mineral matter of the dried sludge which has been burned in the furnace and can be recovered by proper cyclones and dust collectors. Removal of this matter from furnace 18 is indicated by way of line 31.

Further, in the case of sewage sludge for plants having more diluted materials than six percent in the range of approximately four percent, quadruple and quintuple effect evaporators can be utilized to sustain the operation without any added fuel. Of course, in the case of the larger plants the increased capital investment is balanced by saving of fuel, allowing for the multiple-effect operation. The dried sewage sludge is charged to the boiler in a powdered form and steam is generated in the boiler from the combustion of this fuel. This steam can be generated at higher pressures in larger plants, thereby not only providing adequate steam for the evaporator, but also sufficient to run steam turbines and generate power for running the equipment in the plant so that the plant is self-sustaining, not only in fuel, but also in power.

An additional advantage of the drying system for sewage sludge is that the higher temperatures required for carrying out the drying operations also result in sterile finished sewage sludge powder. The dried powder can be utilized as a fertilizer when it has satisfactory nitrogen and mineral content. If the sewage solids product turns out to have more value other than as fuel, the finished dry sludge powder can be withdrawn for sale.

The same technique can be utilized for producing and handling solids products from other materials which are found in water solution or dispersion such as powdered coal, cement, spent lime, slimes, black liquor from the paper industry, etc., and which in that condition may be admixed with an oil to form a slurry. In many of these cases the lower cost fuel oil will be utilized.

Besides the stream of dry, substantially oil-free sewage solids leaving expeller 26 through line 27, there is a stream of oil pumped away from this machine through line 33. This stream represents the oil pressed or expelled out of the stream of essentially water-free but still oil-containing material delivered to the expeller through line 25 from centrifuge 22. As shown, line 33 connects into line 21 so that oil flowing through line 33 mixes with and further fluidizes the dry slurry of oil and sewage solids flowing from third evaporator stage 17 to the centrifuge. This is not the only way in which oil from the expeller can be handled. Such oil might, for instance, be sent to centrifuge oil tank 24 for prompt recycling to fluidizing tank 2. Further, assuming that the sewage sludge is itself originally oil-containing and that there is vigorous centrifuging and [pressing or] expelling to effect oil separation from sewage solids, some expelled oil may be withdrawn from the system as a net product while the remainder stays in circulation as a fluidizing material to obviate adding any oil or tallow to the system except the quantity needed for start-up purposes.

It is to be understood that this invention is not limited to the specific examples and equipment which have been offered merely as illustrations, and that modifications may be made without departing from the spirit of the invention as the invention is set forth in the appended claims.

What is claimed is:

1. A process for dehydrating *initially water-containing* waste solids concentrates which comprises the steps of (*1*) admixing *such* a waste solids concentrate with a relatively non-volatile oil to obtain a mixture which will remain fluid and pumpable after the removal of the water content therefrom; (*2*) *separately* subjecting the resultant oil-containing mixture to a plurality of sequential dehydration steps by heat evaporation wherein each of the successive dehydration steps is at a successively higher temperature and the resulting oil-containing mixtures are of successively higher concentrations because of increasing dehydration, the evolved vapors from each heat evaporation step supplying a substantial portion of the heat requirements of the preceding heat evaporation step, (*3*) and withdrawing a resultant substantially anhydrous waste solids concentrate *and* oil slurry.

2. The process of claim 1 in which a processing temperature of the oil and *initially water-containing* waste solids concentrate mixture in the range of about 70° to 250° F. is utilized in the first dehydration step, and a processing temperature of this mixture in the range of about 150° to 400° F. in the subsequent dehydration steps.

3. The process of claim 1 including the additional step of separating oil from the anhydrous waste solids concentrate *and* oil slurry to give a substantially oil-free waste solids product.

4. The process of claim [2] *3* including the additional step of recycling separated oil to the *initially water-containing* waste solids concentrate admixture step.

5. The process of claim [2] *3* including the additional step of utilizing recovered waste solids product as fuel for [the process] *supplying heat for said dehydration steps by heat evaporation.*

*6. An apparatus for dehydrating initially water-containing waste solids concentrates, said apparatus comprising (1) a tank adapted to receive a stream of such a waste solids concentrate and a stream of oil and wherein a mixing of these streams may be effected, (2) a multi-effect evaporator adapted to have fluid material to be heated and evaporated in it and vaporous material to effect this heating and evaporating flow through it countercurrently and having a first outlet in its last evaporating region whereat material heated and dehydrated in this region but in a fluid state on account of a content of oil withdrawn from it, and further having a second outlet in its first evaporating region whereat water driven off as vapor from said mixture of waste solids concentrate and oil in said first evaporating region may be withdrawn therefrom, (3) a conduit extending from said tank to said multi-effect evaporator wherethrough a mixture of waste solids concentrate and oil may flow from said tank to the inlet of the first evaporating region of said evaporator, (4) pressing apparatus adapted to effect a separation of liquid-solid mixtures into their respective liquid and solid components, and (5) a conduit extending from said first outlet in the last evaporating region of said multi-effect evaporator to said pressing apparatus wherethrough a substantially anhydrous mixture of waste solids concentrate and oil may flow from said evaporator to said pressing apparatus.*

*7. The apparatus of claim 6 which further comprises condensing apparatus, and a conduit extending from said second outlet in the first evaporating region of said evaporator to said condensing apparatus wherethrough water driven off as vapor from said mixture of waste solids concentrate and oil in said first evaporating region may flow from said region to said condensing apparatus to be recondensed to water therein.*

*8. The apparatus of claim 6 which further comprises a conduit extending from said pressing apparatus to said tank wherethrough separated liquid oil from said pressing apparatus may flow to said tank to be mixed therein with said stream of initially water-containing waste solids concentrate.*

*9. The apparatus of claim 6 which further comprises combustion apparatus associated with said multi-effect evaporator for supplying evaporative heat thereto, and means for discharging separated waste solids from said pressing apparatus to said combustion apparatus, said combustion apparatus being adapted to receive said solids and burn the same as fuel to provide at least part of the evaporative heat required by said multi-effect evaporator.*

*10. The apparatus of claim 9 in which said combustion apparatus associated with said multi-effect evaporator comprises a boiler-furnace for the generation of steam, and a conduit extending from said boiler-furnace to said evaporator wherethrough fresh heating steam may flow from the boiler-furnace to the evaporator.*

References Cited

The following references, cited by the Examiner, are of record in the patented file of this patent or the original patent.

UNITED STATES PATENTS

| | | | |
|---|---|---|---|
| 2,151,079 | 3/1939 | Bowen | 210—2 |
| 2,182,428 | 12/1939 | Fladmark | 159—48 |
| 2,189,083 | 2/1940 | Renkin | 159—48 X |
| 2,524,753 | 10/1950 | Betts | 23—48 |

WILBUR L. BASCOMB, JR., *Primary Examiner.*

NORMAN YUDKOFF, *Examiner.*

J. SOFER, *Assistant Examiner.*

UNITED STATES PATENT OFFICE

CERTIFICATE OF CORRECTION

Reissue No. 26,317 December 5, 1967

Charles Greenfield

It is hereby certified that error appears in the above numbered patent requiring correction and that the said Letters Patent should read as corrected below.

Column 4, line 5, for "7.2" read -- 7.2% --; column 5, line 62, strike out the heavy brackets around "pressing or"; column 6, line 45, after "oil", in italcis, insert -- may be --, in italics.

Signed and sealed this 18th day of March 1969.

(SEAL)
Attest:

Edward M. Fletcher, Jr.
Attesting Officer

EDWARD J. BRENNE
Commissioner of Patent